(12) United States Patent
Ramaswamy et al.

(10) Patent No.: US 8,861,937 B2
(45) Date of Patent: Oct. 14, 2014

(54) METHODS AND APPARATUS TO ACCESS MEDIA

(75) Inventors: Arun Ramaswamy, Tampa, FL (US); Alan Nguyen Bosworth, Odessa, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 140 days.

(21) Appl. No.: 13/222,909

(22) Filed: Aug. 31, 2011

(65) Prior Publication Data

US 2013/0051772 A1    Feb. 28, 2013

(51) Int. Cl.
| H04N 5/76 | (2006.01) |
| G06Q 30/00 | (2012.01) |
| G06F 15/16 | (2006.01) |
| H04N 21/258 | (2011.01) |
| G06Q 30/02 | (2012.01) |
| H04N 21/4788 | (2011.01) |

(52) U.S. Cl.
CPC ..... *H04N 21/4788* (2013.01); *H04N 21/25875* (2013.01); *G06Q 30/02* (2013.01)
USPC ....................................... 386/291

(58) Field of Classification Search
None
See application file for complete search history.

(56) References Cited

U.S. PATENT DOCUMENTS

| 6,542,936 B1 | 4/2003 | Mayle et al. |
| 6,976,028 B2 | 12/2005 | Fenton et al. |
| 7,190,971 B1 | 3/2007 | Kawamoto |
| 7,386,798 B1 | 6/2008 | Heikes et al. |
| 7,444,353 B1 | 10/2008 | Chen et al. |
| 7,467,212 B2 | 12/2008 | Adams et al. |
| 7,562,392 B1 | 7/2009 | Rhoads et al. |
| 7,881,657 B2 | 2/2011 | Wang et al. |
| 7,941,816 B2 | 5/2011 | Harkness et al. |
| 8,464,163 B2 | 6/2013 | Heikes et al. |
| 2002/0072982 A1 | 6/2002 | Barton et al. |
| 2002/0135471 A1* | 9/2002 | Corbitt et al. ................. 340/436 |
| 2003/0012548 A1 | 1/2003 | Levy et al. |
| 2003/0018974 A1* | 1/2003 | Suga ............................... 725/86 |

(Continued)

FOREIGN PATENT DOCUMENTS

| WO | 93/22875 | 11/1993 |
| WO | 96/27840 | 9/1996 |
| WO | 01/46843 | 6/2001 |
| WO | 2007/052285 | 5/2007 |

OTHER PUBLICATIONS

HD HomeRun Dual, SiliconDust, Pleasanton, CA, www.silicondust.com, Mar. 22, 2011, 2 pages.

(Continued)

*Primary Examiner* — Hung Dang
*Assistant Examiner* — Sunghyoun Park
(74) *Attorney, Agent, or Firm* — Hanley, Flight and Zimmerman, LLC

(57) ABSTRACT

Methods, apparatus, and articles of manufacture to share media are disclosed. An example method involves receiving from a mobile device a representation of media content detected at the mobile device. The example method also involves receiving from the mobile device a first user identifier of a first user of the mobile device and a second user identifier of a second user different from the first user. In addition, the media content is identified based on the representation of the media content. The second user is selectively provided with access to the media content based on the second user identifier.

19 Claims, 8 Drawing Sheets

(56) References Cited

U.S. PATENT DOCUMENTS

| | | |
|---|---|---|
| 2004/0121723 A1* | 6/2004 | Poltorak .................. 455/3.01 |
| 2004/0243634 A1 | 12/2004 | Levy |
| 2006/0136419 A1 | 6/2006 | Brydon et al. |
| 2006/0239500 A1 | 10/2006 | Meyer et al. |
| 2006/0259957 A1 | 11/2006 | Tam et al. |
| 2007/0039025 A1 | 2/2007 | Kraft et al. |
| 2007/0072597 A1 | 3/2007 | Peuziat et al. |
| 2007/0118853 A1 | 5/2007 | Kreitzer et al. |
| 2007/0118910 A1 | 5/2007 | Taylor |
| 2007/0130580 A1 | 6/2007 | Covell et al. |
| 2007/0143778 A1 | 6/2007 | Covell et al. |
| 2007/0168463 A1 | 7/2007 | Rothschild |
| 2007/0168543 A1 | 7/2007 | Krikorian et al. |
| 2007/0214180 A1 | 9/2007 | Crawford |
| 2007/0294177 A1 | 12/2007 | Volk et al. |
| 2008/0059992 A1 | 3/2008 | Amidon et al. |
| 2008/0208692 A1* | 8/2008 | Garaventi et al. ............ 705/14 |
| 2008/0320391 A1* | 12/2008 | Lemay et al. ............ 715/702 |
| 2009/0083808 A1 | 3/2009 | Morrison |
| 2009/0144392 A1 | 6/2009 | Wang et al. |
| 2010/0029326 A1 | 2/2010 | Bergstrom et al. |
| 2010/0095009 A1 | 4/2010 | Matuszewski et al. |
| 2010/0122184 A1* | 5/2010 | Vonog et al. .................. 715/753 |
| 2010/0214419 A1 | 8/2010 | Kaheel et al. |
| 2010/0262657 A1 | 10/2010 | Little |
| 2010/0332283 A1 | 12/2010 | Ng et al. |

OTHER PUBLICATIONS

Fink et al., "Social- and Interactive-Television Applications Based on Real-Time Ambient-Audio Identification," European Conference on Interactive Television (EuroITV) 2006, 10 pages.

Wade Roush, "Capturing Online Video Pirates," Aug. 22, 2006, [retrieved from http://www.technologyreview.com/printer_friendly_article.aspx?id=17343 on Aug. 15, 2007] 3 pages.

Chris Nuttall, "Facebook to expand with 'social plug ins'," Financial Times, Apr. 22, 2010 [retrieved from www.ft.com/cms/s/2/46b65260-4d9a-11df-9560-00144feab49a.html#axzz2e3Bluimr] 2 pages.

Ryan Paul, "First look at Buzz: much potential, not much innovation yet," arstechnica [retrieved from http://arstechnica.com/information-technology/2010/02/first-look-at-buzz-much-potential-not-much-innovation-yet/] Last Updated Feb. 11, 2010, 4 pages.

* cited by examiner

METHODS AND APPARATUS TO ACCESS MEDIA

FIELD OF THE DISCLOSURE

The present disclosure relates generally to monitoring media and, more particularly, to methods and apparatus to access media.

BACKGROUND

People are often exposed to media content presented by media presentation devices such as televisions, radios, computers, media reproduction devices (e.g., digital versatile disk players, compact disk players, tape players, personal video recorder, a digital video recorder, etc.), etc. Such media exposure may occur within private places such as households and/or work environments and/or may occur within public places such as restaurants, retail establishments, malls, stores, entertainment venues, etc. When a person is interested in obtaining and/or sharing media content to which the person is exposed, the person must often spend significant time and resources to identify the media content, determine where to obtain copies of the media content, and identify the most suitable manner of sharing the media content with others. Such exhaustion of time and resources often discourages people from seeking to obtain and/or share the media content.

DETAILED DESCRIPTION

Figure 1:
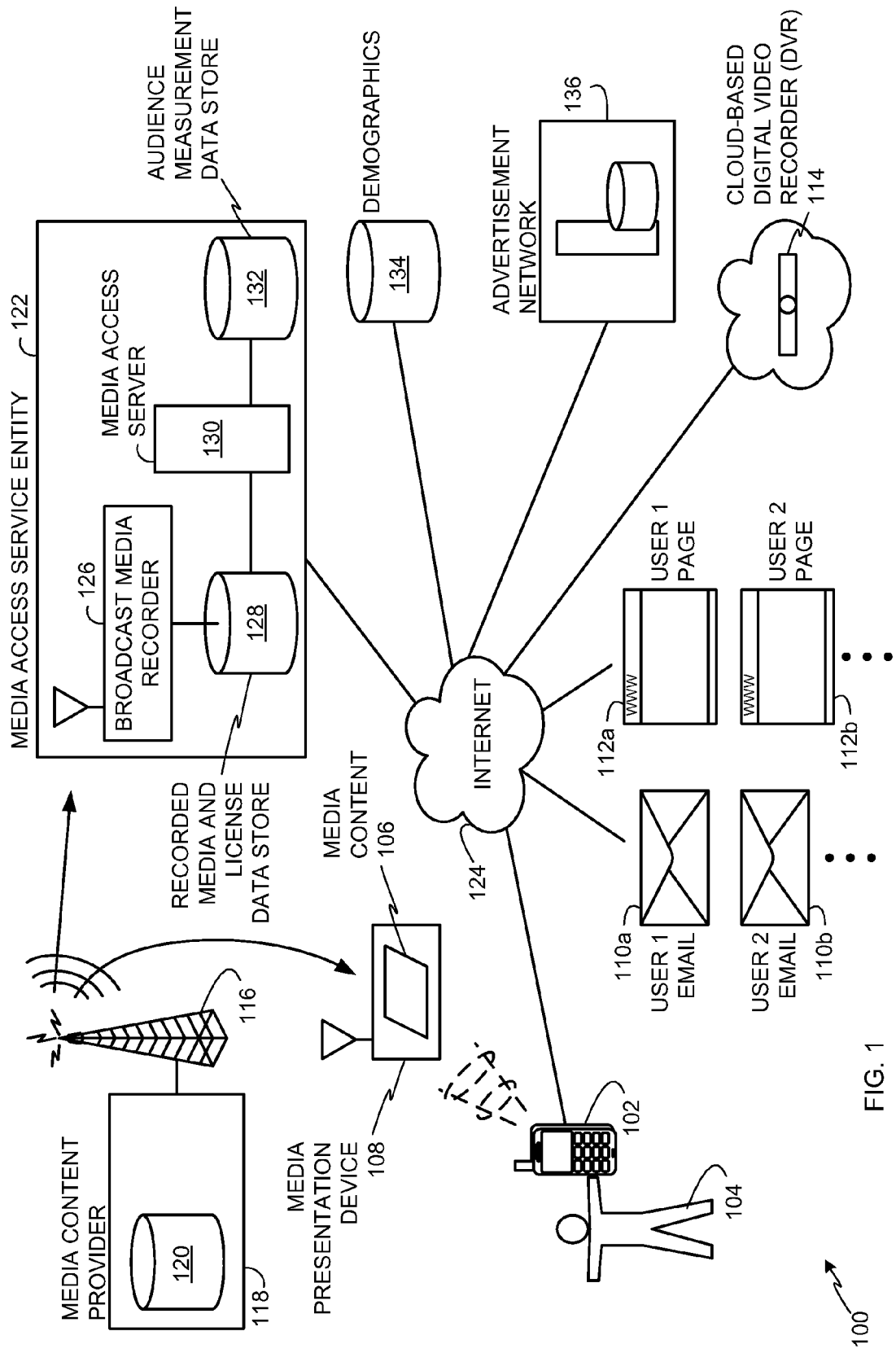
FIG. 1 illustrates an example internetwork system that may be used to share and/or record media content.

Example methods, apparatus, systems, and articles of manufacture disclosed herein may be used to share media. Some examples disclosed herein may be used to equip user devices such as personal computers, portable devices, mobile phones, Internet appliances, and/or any other user device to monitor media presentations occurring external to the user devices and enable users to share and/or record media content detected in the monitored media presentations.

Disclosed example methods to share and/or record media involve receiving from a mobile device media-representative information (e.g., a representation (e.g., a signature, a code, a recorded segment, metadata, etc.) of media content) detected by the mobile device via a sensor (e.g., a microphone, a camera or imaging sensor, etc.). The media content (e.g., a television program, a movie, a newscast, radio content, a song, an image, an advertisement, etc.) is presented by a media presentation device (e.g., a television, a radio, a computer, an audio/video advertisement device, etc.) separate from the mobile device. Such example methods also involve receiving from the mobile device a first user identifier (e.g., an email address, a username, etc.) of a first user of the mobile device and a second user identifier (e.g., an email address, a username, etc.) of a second user. Such example methods also involve identifying the media content based on the representation of the media content. In some such examples, the first user identifier is used to send the first user a hyperlink corresponding to an Internet location (e.g., a media database proprietor server) that provides access to the media content.

Some example methods selectively provide the second user with access to the media content based on the second user identifier. For example, a media database proprietor server may send a copy of the media content to an email address or a web page of the second user based on the second user identifier. Additionally or alternatively, a hyperlink to the media content stored at a media database may be sent to the email address or posted to the web page of the second user based on the second user identifier.

In some examples, an audience-interest credit or receptivity credit is awarded to at least one of a television program episode, a movie, or a song advertised in the media content based on receiving the representation of the media content from the mobile device. As used herein, audience-interest or receptivity indicates audience interest in media content or media content categories. The audience-interest or receptivity metric quantifies receptivity and may be measured by detecting when an audience member elects to share media content to which the audience member was exposed. Such audience-interest or receptivity metric may indicate that the audience member found the media content relevant to her/him and/or that the audience member would like to see other similar or related media content (e.g., in the same category/genre, by the same media network, by the same production company/record label, by the same artist, with the same actor(s), about the same product, etc.).

In some examples, additional content relevant to at least one of the first user or the second user is identified based on at least one of a characteristic of the media content or demographic information of the first user and/or the second user. For example, such additional content may be one or more advertisements selected as relevant to at least one of the first user or the second user based on their demographic information or selected as relevant to the nature of the media content based on the characteristic of the media content. Additionally or alternatively, such additional content may be one or more of television program episode(s) or clip(s), song(s) or song clip(s), movie(s) or movie clip(s), newscast(s) or newscast clip(s), advertisement(s) and/or any other feature presentation(s) or feature presentation clip(s) selected as relevant to at least one of the first user or the second user based on their demographic information or selected as relevant to the nature of the media content based on the characteristic of the media content.

In some examples, a request may be received from the mobile device to initiate storing of at least one of a copy of the media content, a copy of a television program episode advertised in the media content, a copy of a movie advertised in the media content, or a copy of a song advertised in the media content. In such examples, the storing may occur at a cloud-based digital video recorder location accessible by the first user.

Example systems and apparatus to share media are also disclosed. A disclosed example system includes an application program distribution interface to provide access to an application program for downloading to a user device. In some examples, the application program receives user input from a first user to cause the user device to initiate a sampling of ambient sound detectable by the user device, collect representative information (e.g., a signature, a code, a recorded segment, metadata, etc.) corresponding to media content contributing to the ambient sound, and receive an indication of a second user to receive access to the media content. In some examples, the media content is presented by a media presentation device (e.g., a television, a radio, a computer, an audio/video advertisement device, etc.) that is separate from the user device. Some such example systems also include a query interface to receive the representative information from the user device via internetwork communications and a media content recognizer to identify the media content based on the representative information. In addition, some such example system includes a media access provider to send to the first user a hyperlink to access the media content and to selectively provide the second user with access to the media content.

Some disclosed example systems include an advertisement interface to indicate a first advertisement to combine with a presentation of the media content when the media content is accessed via the hyperlink by the first user and to indicate a second advertisement to combine with a presentation of the media content when the media content is accessed by the second user. In some examples, the first advertisement is selected based on at least one of a first demographic characteristic of the first user or a characteristic of the media content, and the second advertisement is selected based on at least one of a second demographic characteristic of the second user or the characteristic of the media content.

Some disclosed example systems include an advertiser interface to submit at least one of the first demographic characteristic, the second demographic characteristic, or the characteristic of the media content to an advertisement network proprietor. In response, the advertisement interface receives from the advertisement network proprietor a first advertisement identifier of the first advertisement and a second advertisement identifier of the second advertisement. In some examples, the advertisement interface indicates the first advertisement based on the first advertisement identifier received by the advertiser interface and indicates the second advertisement based on the second advertisement identifier received by the advertiser interface.

Some disclosed example systems include a cloud-based digital video recorder (DVR) interface to initiate storing of at least one of a copy of the media content, a copy of a television program episode advertised in the media content, a copy of a movie advertised in the media content, or a copy of a song advertised in the media content. In such some examples, the storing occurs at a cloud-based digital video recorder location accessible by the first user.

Some disclosed example systems include an audience-interest interface to award an audience-interest credit or receptivity credit to at least one of the media content, a television program episode advertised in the media content, a movie advertised in the media content, or a song advertised in the media content based on the query interface receiving the representative information from the user device.

FIG. 1 illustrates an example internetwork system 100 that may be used to share and/or record media content (e.g., television program episodes, movies, songs, radio content, newscasts, images, advertisements, etc.). In the illustrated example, a user device 102 operable by a person or user 104 is configured to detect and capture ambient audio and/or video from media content 106 presented by a media presentation device 108. The media presentation device 108 may be separate and external from the user device 102 and/or may be integrated in the user device 102. In this manner, when the user 104 finds an interest in, or an affinity to, media content to which the user 104 is exposed by the media presentation device 108, the user 104 may operate the user device 102 to initiate sharing of the detected media content with one or more others and/or to initiate recording of the detected media content. In illustrated examples disclosed herein, the sharing and/or recording of media content involves sending or providing access to a copy of the media content of interest (e.g., in its entirety). That is, at the request of the user 104, the user device 102 of the illustrated example collects representative information (e.g., a signature, a code, metadata, a recorded audio and/or video sample segment, an image, etc.) from the detected media content 106 that is presented by the media presentation device 108. Based on the collected representative information, the media content 106 can be recognized as discussed in detail below and a copy of the media content 106 in its entirety (e.g., an entire television program episode, an entire movie, an entire song, an entire advertisement, an entire radio program, an entire newscast, etc.) or a clip or portion thereof can be shared with others and/or recorded (or stored) for later playback by the user 104. In some examples, the media content 106 is presented by the media presentation device 108 as part of an advertisement for the media content 106. For example, the media content 106 may be a television program episode advertised in an advertisement, a movie advertised in an advertisement, and/or a song advertised in an advertisement.

In the illustrated example, sharing of the media content 106 may be performed by sending one or more hyperlinks for Internet-accessible location(s) storing copy(ies) of the media content 106 and/or by sending copy(ies) of the media content 106 to user(s) or person(s) via user email account(s) 110a and 110b and/or via posting(s) on personal web page(s) 112a and 112b (e.g., registered user pages of social network services such as Facebook). Also in the illustrated example, recording of the detected media content 106 is performed at a remote network-accessible location such as a cloud-based digital video recorder (DVR) 114 for later playback.

In the illustrated example, the user device 102 is shown as a mobile communication device capable of wireless communications (e.g., cellular communications, Wi-Fi communications, etc.). However, in other examples, techniques disclosed herein may be implemented in connection with other types of user devices such as personal computers, computing tablets (e.g., an IPAD® tablet), personal digital assistants (PDA's), portable media players, electronic watches, wearable electronic accessories, etc. The media presentation device 108 of the illustrated example may be any type of device capable of presenting audio, video, images, etc. perceivable to users (e.g., the user 104) and detectable by user devices (e.g., the user device 102) when in the vicinity of the media presentation device 108. For example, the media presentation device 108 may be a radio, audio speakers, a television, a computer, an advertisement display, etc.

In the illustrated example, the media presentation device 108 is shown as receiving over-the-air (OTA) media content broadcast by a broadcast transmission station 116. In the illustrated example, the broadcast transmission station 116 is operated by a local broadcast media network that receives content from a media content provider 118. The media content provider 118 of the illustrated example may be the local broadcast media network or may be a parent media network or a third-party provider of media content. In the illustrated example, the media content provider 118 includes a media data store 120 that stores media content (e.g., television programs, movies, songs, radio content, images, etc.) to be broadcast by the broadcast transmission station 116 and received and reproduced by the media presentation device 108. Although the illustrated example of FIG. 1 shows the media presentation device 108 as receiving OTA media content broadcast transmissions from the broadcast transmission station 116, in other examples, the media presentation device 108 may additionally or alternatively receive and reproduce media content from cable television/radio transmission systems, satellite transmission systems, Internet-based transmission systems (e.g., satellite radio and/or television, internet protocol television (IPTV), internet radio, streaming audio/video, etc.), and/or storage media (e.g., compact disks (CDs), digital versatile disks (DVDs), hard drives, solid-state memory devices, tapes, network-accessible storage devices, etc.).

In the illustrated example of FIG. 1, an example media access service entity 122 facilitates the sharing and/or recording of the media content 106 detected by the user device 102. The media access service entity 122 and the user device 102 exchange communications via an internetwork such as the Internet 124 as shown in the illustrated example of FIG. 1. To initiate sharing and/or recording of the media content 106, the user 104 interacts with the user device 102 to submit a request. In response, the user device 102 sends the request to the media access service entity 122 in the form of a query along with media-representative information collected by the user device 102 from the detected media content 106 presented by the media presentation device 108. In this manner, the media access service entity 122 may perform a media recognition process on the media-representative information to recognize the media content 106 presented by the media presentation device 108 and for which the user 104 has expressed an interest in sharing with one or more other persons and/or an interest in recording or storing for later playback. The media-representative information may be any one or more media representations, such as signatures, codes, metadata, captured media segment samples, audio samples, video samples, etc., that are generated, extracted, and/or collected by the user device 102.

In the illustrated example of FIG. 1, the media access service entity 122 includes a broadcast media recorder 126, a recorded media and license data store 128, a media access server 130, and an audience measurement data store 132. The broadcast media recorder 126 of the illustrated example receives media content broadcast transmissions from the broadcast transmission station 116 and records and/or stores the received media content in the recorded media and license data store 128. The example recorded media license data store 128 also stores licensing information for the stored media. The license information defines any rights of the media access service entity 122 to reproduce, distribute, and/or provide access to the stored media content (e.g., a stored copy of the media content 106) in the recorded media and license data store 128.

In some examples, the broadcast media recorder includes or is connected to multiple tuners (e.g., television tuners and/or radio tuners) so that it can receive multiple broadcast channels simultaneously and record multiple media content being transmitted simultaneously. In this manner, the recorded media and license data store 128 can store numerous media content to which the user 104 and/or other users may be exposed via different media presentation devices such as the media presentation device 108. Storing such a vast quantity of media content enables the media access service entity 122 to provide access to a wide range (e.g., virtually any) media content to which the user 104 (or any other user) may be exposed. For example, if the broadcast transmission station 116 broadcasts a particular television program episode, the media presentation device 108 and the broadcast media recorder 126 will receive it simultaneously. While the media presentation device 108 will reproduce and present the television program episode, the broadcast media recorder 126 will record and/or store a recorded copy of the television program episode in the recorded media and license data store 128. If the user 104 requests to share and/or record the television program episode based on his/her exposure to it via the media presentation device 108, the media access share entity 122 can provide such access and/or recording based on its copy of the television program episode stored in the recorded media and license data store 128.

In the illustrated examples, the media access service entity 122 provides the user 104, and/or any other person(s) indicated by the user 104, access to one or more copies of media content 106 in the form of a hyperlink or a copy of the media content 106. In the illustrated example of FIG. 1, the media access service entity 122 provides such access by sending a hyperlink or a copy of the media content 106 to the email account 110*a* of the user 104 and/or posting a hyperlink or a copy of the media content 106 to the web page 112*a* of the user 104. In addition, the media access service entity 122 sends the hyperlink or copy of the media content 106 to the email account 110*b* of at least a second person indicated by the user 104 and/or posts the hyperlink or copy of the media content 106 to the web page 112*b* of at least the second person indicated by the user 104.

To initiate sharing and/or recording of the media content 106, the media access server 130 of the illustrated example receives a query from the user device 102 requesting to share and/or record the media content 106. In the illustrated example, the media access server 130 recognizes the media content 106 based on media-representative information received in the query from the user device 102 and determines whether a copy of the media content 106 is stored in the recorded media and license data store 128 and/or whether access to such media content 106 must be provided by a third-party (e.g., the media content provider 118). For example, if the media access service entity 122 has not secured a license to record and/or distribute the media content 106, the media access service entity 122 defers to the owner and/or licensee(s) of the media content 106 to provide access to such media content 106. In the illustrated example, the media content provider 118 may be an owner and/or distribution licensee of some media content and/or may have an agreement with the media access service entity 122 to allow the media access service entity 122 to send hyperlinks to users (e.g., the user 104 and/or a number of second users specified by the user 104) that enable accessing requested media content from the media data store 120 and/or another Internet-accessible storage location controlled by the media content provider 118.

In the illustrated example, the media access server 130 also awards audience-interest or receptivity credits to media content in which the user 104 (and/or other users) has expressed an interest by requesting to share and/or record the media content. The media access server 130 of the illustrated example stores such audience-interest or receptivity credits in the audience measurement data store 132 in association with identifiers of corresponding media content. Such audience-interest or receptivity credits can subsequently be used to generate and/or supplement media ratings for different media content.

In some examples, the media access service entity 122 identifies additional or auxiliary media content that may be of interest to the user 104 or one or more second user(s) specified by the user 104 to receive a copy of the indicated media content 106. Such auxiliary media content may be other media programming (e.g., clips of or full-length television program episodes, movies, songs, newscasts, etc.) and/or advertisements. Selection of the auxiliary media content may be performed by the media access server 130 or a third-party system or entity that is separate from the media access service entity 122. The auxiliary media content may be selected based on at least one of a first demographic characteristic(s) of the user 104, a second demographic characteristic(s) of at least a second person specified by the user 104, and/or a characteristic(s) of the media content 106 that the user 104 requested to share and/or record. In some examples, different auxiliary media content may be selected for the user 104 and for the one or more second users. For example, first auxiliary media content for the user 104 may be selected based on at least one of a first demographic characteristic(s) of the user 104 and/or a characteristic of the media content 106, and second auxiliary media content different from the first auxiliary media content may be selected for a second person based on at least one of a second demographic characteristic(s) of the second person and/or the characteristic of the media content 106. Further, when demographic information for the user 104 and/or the second specified person(s) is not available to the media access service entity 122 or a third-party entity that selects auxiliary media content, auxiliary media content can be selected based on one or more characteristics of the media content 106 and/or any other criteria (e.g., a contractual commitment). If the user 104 and/or the second specified person(s) are interested in the subject or contents of the media content 106, there is a high likelihood that the user 104 and/or the second specified person(s) will be interested in auxiliary media content having similarities to one or more characteristics of the media content 106.

To provide the auxiliary media content to the user 104 and/or one or more specified second person(s), the media access server 130 of FIG. 1 generates a media content compilation including a copy of the media content 106 and one or more auxiliary media content and provides the copy of the media content compilation or a hyperlink to access the copy of the media content compilation to the user 104 and/or the one or more specified person(s). As discussed above, auxiliary media content selected for the user 104 may be different from auxiliary media content selected for the one or more specified second person(s). As such, a media content compilation prepared for the user 104 may have different auxiliary media content than a media content compilation prepared for the one or more specified second person(s). When the user 104 selects to record or store a copy of the media content 106 in the cloud-based DVR 114, a corresponding media content compilation including the auxiliary media content is stored in the cloud-based DVR 114 for later playback by the user 104.

To store demographic information of the user 104 and other persons, a demographics data store 134 is operated and maintained by the media access service entity 122 or a third-party database proprietor. In some examples, the media access service entity 122 maintains a demographics database and a third-party database proprietor maintains another demographics database. In this manner, when the media access service entity 122 does not have demographic information for a particular user, the media access service entity 122 may request such demographic information from the third-party database proprietor. In some examples, demographic information may be maintained based on specific persons and/or based on geographic areas of different demographic markets. For demographic information stored for specific users, such demographic information is matched to specific users based on unique user identifiers. For demographic information stored for geographic areas, such demographic information is matched to different users based on geographic-indicative identifiers. Such geographic indicative identifiers may be, for example, internet protocol (IP) addresses assigned to particular geographic areas, IP address prefixes assigned to particular geographic areas, cellular tower identifiers, postal zip codes, municipality names, etc.

In some examples in which auxiliary media content may be advertisements, such advertisements are provided by one or more advertisement networks, one of which is shown in the illustrated example of FIG. 1 as an advertisement network proprietor 136. In the illustrated example, to select advertisements that are relevant to the user 104 and/or the specified second person(s), the media access server 130 sends demographic information and/or characteristic information of the media content 106 to the advertisement network proprietor 136. The media access server 130 then receives one or more copy(ies) of, or one or more hyperlink(s) to, one or more relevant advertisement spot(s) from the advertisement network proprietor 136.

Figure 2:
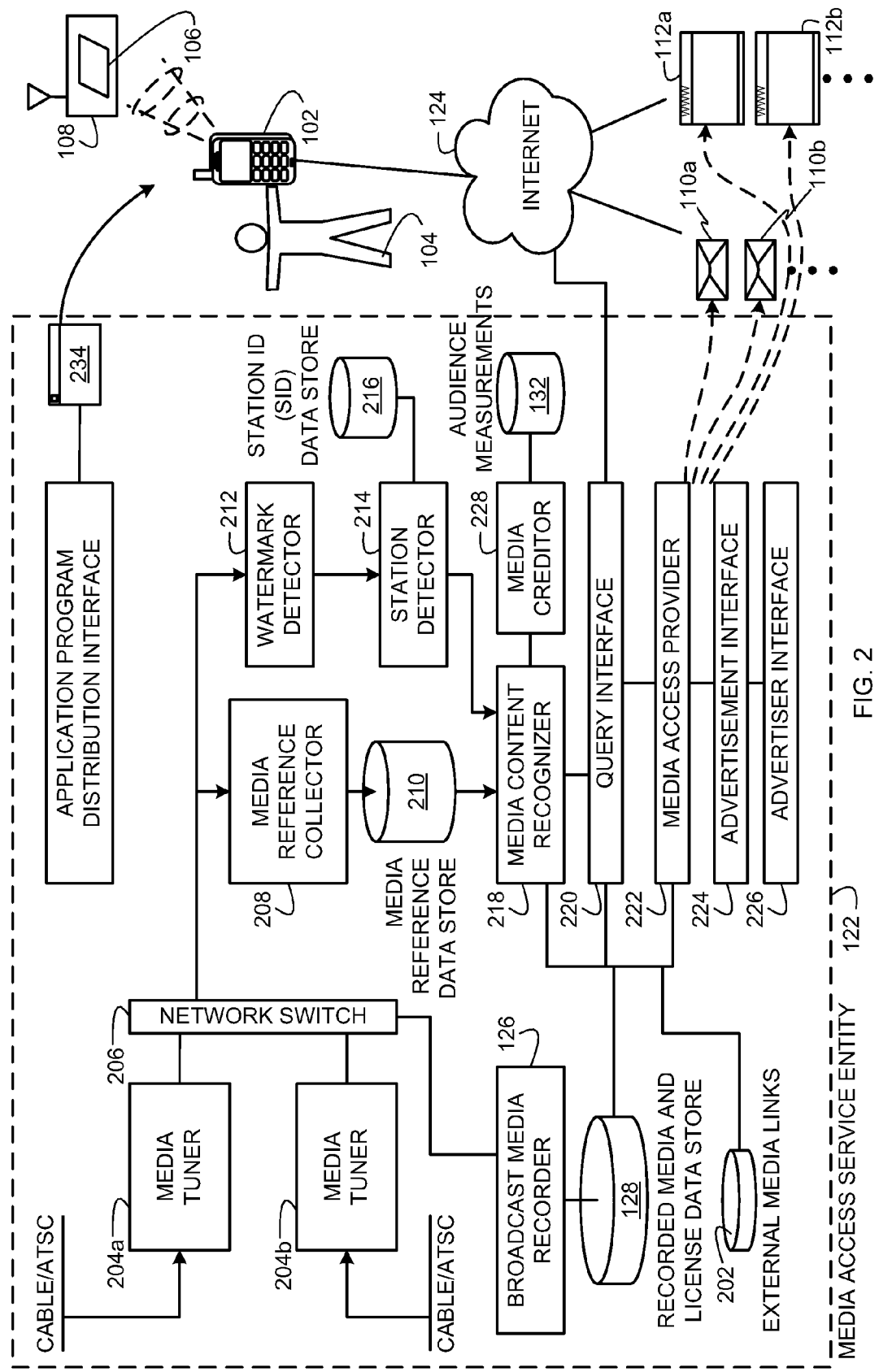
FIG. 2 illustrates an example implementation of the media access service entity of FIG. 1 to facilitate sharing and/or recording media content.

FIG. 2 illustrates an example implementation of the example media access service entity 122 of FIG. 1 to facilitate sharing and/or recording media content (e.g., the media content 106 of FIG. 1). In the illustrated example, the media access service entity 122 includes the broadcast media recorder 126 and the recorded media and license data store 128 of FIG. 2. To store a hyperlink to media content (e.g., the media content 106 of FIG. 1) or to auxiliary media content (e.g., an advertisement, a similar or related television program episodes, a movie, a song, a newscast, etc.), the media access service entity 122 of the illustrated example is provided with an external media links data store 202. In some examples, hyperlinks stored in the external media links data store 202 correspond to advertisements hosted by the advertisement network proprietor 136 of FIG. 1.

In the illustrated example, to receive OTA broadcast media transmissions, IP-based media transmissions, or cable-distribution system based media transmissions, the media access service entity 122 is provided with media tuners 204a-b. Each of the media tuners 204a-b of the illustrated example is implemented using an HDHomeRun® dual tuner, model no. HDHR3-US, manufactured and sold by SiliconDust USA, Inc. of Pleasanton, Calif., USA. The HDHomeRun® dual tuner is a high-definition (HD) television tuner that receives and tunes broadcast media transmissions using two tuners and outputs media content streams via an Ethernet network port. Additionally or alternatively, one or both of the media tuners 204a-b and/or other media tuners of the media access service entity 122 may be implemented using other OTA television tuners, OTA radio tuners, Internet radio tuners, and/or IPTV tuners. To distribute the media content to the broadcast media recorder 126, the media tuners 204a-b are connected to a network switch 206, which may be implemented using, for example, a 100 Mbps Ethernet switch.

To generate and/or collect media-representative information (e.g., audio/video signatures, codes, metadata, sample segments, etc.), the media access service entity 122 of FIG. 2 is provided with a media reference collector 208. In the illustrated example, the media reference collector 208 is to receive a reproduction of the media content 106 and collect media-representative reference information by generating audio and/or video signatures based thereon, extracting codes therefrom, extracting metadata therefrom, and/or recording or copying sample segments thereof. An example media references data store 210 stores the media-representative reference information generated and/or collected by the media reference collector 208.

The media-representative reference information may be subsequently used by the media access service entity 122 to recognize or identify media content (e.g., the media content 106 presented by the media presentation device 108). For example, when the user device 102 collects media-representative information, and sends the media-representative information to the media access service entity 122, the media access service entity 122 can compare the received media-representative information with media-representative reference information stored in the media reference data store 210 to recognize or identify the media content 106. In this manner, the media access service entity 122 can provide the user 104 and/or any other specified second persons access to a copy of the media content 106 stored, for example, in the recorded media license data store 128 or at an external third-party media data store (e.g., the media data store 120 of the media content provider 118 of FIG. 1).

To recognize media transmission sources, the media access service entity 122 is provided with a watermark detector 212. In the illustrated example, the watermark detector 212 analyzes and detects station-identifying watermarks in received media content transmissions. Such watermarks identify the source of the media broadcasts and can be in the form of audio watermarks or video watermarks. For example, audio watermarks may be unique chimes or tunes that identify the transmitting station. Video watermarks may be in the form of graphic symbols or text located at top or bottom portions of a video display. Audio and/or video watermarks which are not human-detectable may alternatively or additionally be employed.

In the illustrated example, an example station detector 214 receives detected watermark information from the watermark detector 212 and accesses a station ID (SID) data store 216 to retrieve reference watermarks. The SID data store 216 stores reference watermarks in association with corresponding station identifiers (e.g., station identifiers corresponding to the broadcast transmission station 116 and/or the media content provider 118). In this manner, the station detector 214 can compare detected watermarks received from the station detector 214 to reference watermarks from the SID data store 216 and find matches to identify broadcasting stations that sourced the received media content (e.g., a broadcast copy of the media content 106).

To recognize media content (e.g., a broadcast copy of the media content 106), the media access service entity 122 is provided with a media content recognizer 218. To receive requests to share and/or record media content (e.g., the media content 106), the media access service entity 122 is provided with a query interface 220. In the illustrated example, the query interface 220 receives one or more queries from the user device 102 including media-representative information collected from the user device 102 based on its exposure to the media content 106 presented by the media presentation device 108. The query interface 220 sends collected media-representative information received from the user device 102 via the query to the media content recognizer 218. The media content recognizer 218 compares the collected media-representative information with media-representative references from the media reference data store 210 to find a match and, thus, recognize the media content 106 presented by the media presentation device 108.

When the media content recognizer 218 of the illustrated example identifies the media content 106, it provides the query interface 220 a storage location in the recorded media and license data store 128 that stores a copy of the media content 106. The query interface 220 of the illustrated example then submits a request for access to the copy of the media content 106 to an example media access provider 222. In the illustrated example, the media access provider 222 analyzes the existence and extent of licensing terms stored in the recorded media and license data store 128 to determine whether the media access service entity 122 may provide access to its copy of the media content 106 stored in the recorded media and license data store 128. If the media access provider 222 determines that access rights exist, then the media access provider 222 provides the requested access to the stored copy of the media content 106 in the form of a hyperlink or an actual copy of the media content 106.

If the media access provider 222 determines that access rights do not exist for the requested copy of the media content 106 based on license information in the recorded media and license data store 128, the media access provider 222 retrieves an external hyperlink from an external media links data store 202. In the illustrated example, the external media links data store 202 stores hyperlinks to Internet-accessible storage locations of other media database proprietors (e.g., the media data store 120 of the media content provider 118) at which requested media content may be accessed. In some example implementations, the media access provider 222 additionally or alternatively sends requests to other media database proprietors to obtain hyperlinks to their media content in addition to or instead of storing external hyperlinks in the external media links data store 202.

In the illustrated example, the media access provider 222 also identifies auxiliary content that may be of interest to persons based on the currently and/or previously requested media content (e.g., the media content 106 and/or media content previously requested by that user) and/or demographics of the persons involved in the request (e.g., the user 104 and/or one or more second persons specified by the user 104 to receive access to the media content 106). In the illustrated example, the media access provider 222 accesses characteristic information of media content stored in the recorded media and license data store 128 and accesses demographic information in the demographic data store 134 of FIG. 1. In the illustrated example, to find other media content in the recorded media and license data store 128 that may be of interest to the user 104 and/or specified second person(s), the media access provider 222 compares characteristic information of the media content 106 with characteristic information of other media content stored in the recorded media and license data store 128. Also in the illustrated example, in association with its stored media content, the recorded media and license data store 128 stores demographic information indicative of audiences to which the media content may be of interest or may be relevant. In this manner, when the query interface 220 receives a request from the user device 102 to share and/or record the media content 106, the media access provider 222 can retrieve demographic information from the demographics data store 134 of FIG. 1 for the user 104 and/or one or more specified second persons. The media access provider 222 can then find auxiliary media content in the recorded media and license data store 128 having matching demographic information. The media access provider 222 then forms a media compilation of the copy of the requested media content 106 and the auxiliary media content, and provides to the user 104 and/or one or more specified second users with access to the media compilation in response to the request received from the user 104.

In some example implementations, auxiliary media content includes one or more advertisements. To find relevant advertising spots, the media access service entity 122 is provided with an advertisement interface 224 and an advertiser interface 226. In the illustrated example, the advertisement interface 224 indicates an advertisement to combine with a presentation of the media content 106 when access to the media content 106 is provided to the first user in the form of a copy thereof or a hyperlink thereto. In some examples, the advertisement interface 224 of the illustrated example indicates another advertisement to combine with a presentation of the media content 106 when access to the media content 106 is provided to one or more second persons specified by the user 104. Such access to second users may also be in the form of a hyperlink or a copy delivered to the second users. In some examples, the advertisement interface 224 may obtain advertisement spots from the recorded media and license data store 128 of the media access service entity 122. Additionally or alternatively, the advertisement interface 224 may work with the advertiser interface 226 to retrieve advertisement spots from sources external to the media access service entity 122.

In the illustrated example, to retrieve advertisement spots from, for example, the advertisement network proprietor 136 of FIG. 1, the advertiser interface 226 submits to the advertisement network proprietor 136 at least one of a demographic characteristic corresponding to the user 104, a demographic characteristic corresponding to at least a second person specified by the user 104 to receive access to a copy of the media content 106, an identity of the media content 106, and/or a characteristic of the media content 106. In response, the advertiser interface 226 receives a first advertisement identifier of a first advertisement found to be relevant to the user 104 based on at least one of the demographic information of the user 104, the identity of the media content 106, and/or the characteristic of the media content 106. The advertiser interface 226 also receives a second advertisement identifier of a second advertisement found to be relevant to the second person identified by the user 104 based on at least one of the demographic information of the second person, the identity of the media content 106, and/or the characteristic of the media content 106. In this manner, the advertiser interface 226 can communicate the first and second advertisement identifiers to the advertisement interface 224. The advertisement interface 224 of the illustrated example provides the media access provider 222 with a hyperlink to the first advertisement based on the first advertisement identifier and a hyperlink to the second advertisement based on the second advertisement identifier.

As shown in the illustrated example of FIG. 2, the media access provider 222 provides access to the media content 106 or a media content compilation including the media content 106 and auxiliary media content by sending a hyperlink and/or a copy of the media content 106 or compilation to each of the user email accounts 110a-b and/or by posting hyperlink(s) and/or copy(ies) of the media content 106 or compilation to user web pages 112a-b.

In the illustrated example, the media access service entity 122 is provided with a media creditor 228 and the audience measurement data store 132. In the illustrated example, the media creditor 228 awards audience-interest credits or receptivity credits to media content in which users have requested to share and/or record. For example, when the media content recognizer 218 identifies or recognizes the media content 106 which the user 104 has requested to share and/or record, the media content recognizer 218 informs the media creditor 228 of the identity of the media content 106. In turn, the media creditor 228 awards an audience-interest or receptivity credit to the media content 106 in the audience measurement data store 132. In the illustrated example, the audience measurement data store 132 stores tallies or counts of receptivity credits for different media content recognized by the media content recognizer as requested to be shared and/or recorded by users.

In the illustrated example, the media access service entity 122 is provided with an application program distribution interface 232 to download a media access application program 234 to the user device 102 and/or any other user devices. When executed by the user device 102, the media access application program 234 causes the user device 102 to detect media content presented by media presentation devices (e.g., the media content 106 presented by the media presentation device 108) as requested by the user 104 and to send requests along with collected media-representative information to the media access service entity 122 to share and/or record the detected media content. In some examples, while the user 104 is carrying the user device 102, the media access application program 234 may run automatically and make inferences on media content in which the user 104 may be interested. For example, the user 104 may provide the media access application program 234 with media preferences of likes and/or dislikes (e.g., genre, artists, actors, movie types, television program types, music decades, etc.) during a configuration process and set the media access application program 234 to run as a background application that periodically samples ambient audio in search of any media content. When the media access application program 234 detects media content in which the user 104 may be interested, the media access application program 234 causes the user device 102 to store media-representative information and media content identifiers (e.g., song title, television program title, television program episode number, newscast program name, movie title, etc.) in a list of pending media suggestions. The media access application program 234 then displays a listing of collected media suggestions for the user 104, and the user 104 can select any of the media suggestions in which the user 104 is interested. Selection by the user 104 of one or more of the media suggestions causes the user device 102 to send corresponding share and/or record queries to the query interface 220 in the manner explained above.

In the illustrated example, to facilitate the media access application program 234 to recognize media content that may be of interest to the user 104 based on the user-provided media preferences, the user device 102 automatically sends media identification queries to the query interface 220 along with collected media-representative information. In response, the query interface 220 sends back media content identifiers (e.g., song title, television program title, television program episode number, newscast program name, movie title, etc.) and media metadata (e.g., genre, artist name, movie type, television program type, song decade, etc.) based on media recognition processes performed by the media content recognizer 218. In this manner, the media access application program 234 can compare the received media content identifiers and/or metadata with its locally stored user-provided preferences to determine which detected media content may be of interest to the user 104. In other examples, the media access application program 234 may send its locally stored user-provided preferences to the query interface 220 and request that the query interface 220 provide media content identifiers (e.g., song title, television program title, television program episode number, newscast program name, movie title, etc.) only when the detected media content would be of interest to the user 104 based on the user-provided media preferences.

In the illustrated example of FIG. 2, the example media access server entity 122 may include one or more systems and/or apparatus to implement the broadcast media recorder 126, the recorded media and license data store 128, the external media links data store 202, the media tuners 204a-b, the network switch 206, the media reference collector 208, the media reference data store 210, the watermark detector 212, the station detector 214, the SID data store 216, the media content recognizer 218, the query interface 220, the media access provider 222, the advertisement interface 224, the advertiser interface 226, the media creditor 228, the audience measurement data store 132, and/or the application program distribution interface 232. While an example manner of implementing such one or more systems and/or apparatus has been illustrated in FIG. 2, one or more of the elements, processes and/or devices illustrated in FIG. 2 may be combined, divided, re-arranged, omitted, eliminated and/or implemented in any other way. Further, the broadcast media recorder 126, the recorded media and license data store 128, the external media links data store 202, the media tuners 204a-b, the network switch 206, the media reference collector 208, the media reference data store 210, the watermark detector 212, the station detector 214, the SID data store 216, the media content recognizer 218, the query interface 220, the media access provider 222, the advertisement interface 224, the advertiser interface 226, the media creditor 228, the audience measurement data store 132, the application program distribution interface 232 and/or, more generally, the example systems and/or apparatus of FIG. 2 may be implemented by hardware, software, firmware and/or any combination of hardware, software and/or firmware. Thus, for example, any of the broadcast media recorder 126, the recorded media and license data store 128, the external media links data store 202, the media tuners 204a-b, the network switch 206, the media reference collector 208, the media reference data store 210, the watermark detector 212, the station detector 214, the SID data store 216, the media content recognizer 218, the query interface 220, the media access provider 222, the advertisement interface 224, the advertiser interface 226, the media creditor 228, the audience measurement data store 132, and the application program distribution interface 232 and/or, more generally, the example systems and/or apparatus could be implemented by one or more circuit(s), programmable processor(s), application specific integrated circuit(s) (ASIC(s)), programmable logic device(s) (PLD(s)) and/or field programmable logic device(s) (FPLD(s)), etc. In some example implementations, one or more of the broadcast media recorder 126, the recorded media and license data store 128, the external media links data store 202, the media tuners 204a-b, the network switch 206, the media reference collector 208, the media reference data store 210, the watermark detector 212, the station detector 214, the SID data store 216, the media content recognizer 218, the query interface 220, the media access provider 222, the advertisement interface 224, the advertiser interface 226, the media creditor 228, the audience measurement data store 132, and/or the application program distribution interface 232 may be implemented using the media access server 130 of FIG. 1. When any of the appended apparatus or system claims are read to cover a purely software and/or firmware implementation, at least one of the broadcast media recorder 126, the recorded media and license data store 128, the external media links data store 202, the media tuners 204a-b, the network switch 206, the media reference collector 208, the media reference data store 210, the watermark detector 212, the station detector 214, the SID data store 216, the media content recognizer 218, the query interface 220, the media access provider 222, the advertisement interface 224, the advertiser interface 226, the media creditor 228, the audience measurement data store 132, and/or the application program distribution interface 232 appearing in such claim is hereby expressly defined to include a tangible computer readable medium such as a memory, DVD, CD, etc. storing the software and/or firmware. Further still, the example systems and/or apparatus of FIG. 2 may include one or more elements, processes and/or devices in addition to, or instead of, those illustrated in FIG. 2, and/or may include more than one of any or all of the illustrated elements, processes and devices.

Figure 3:
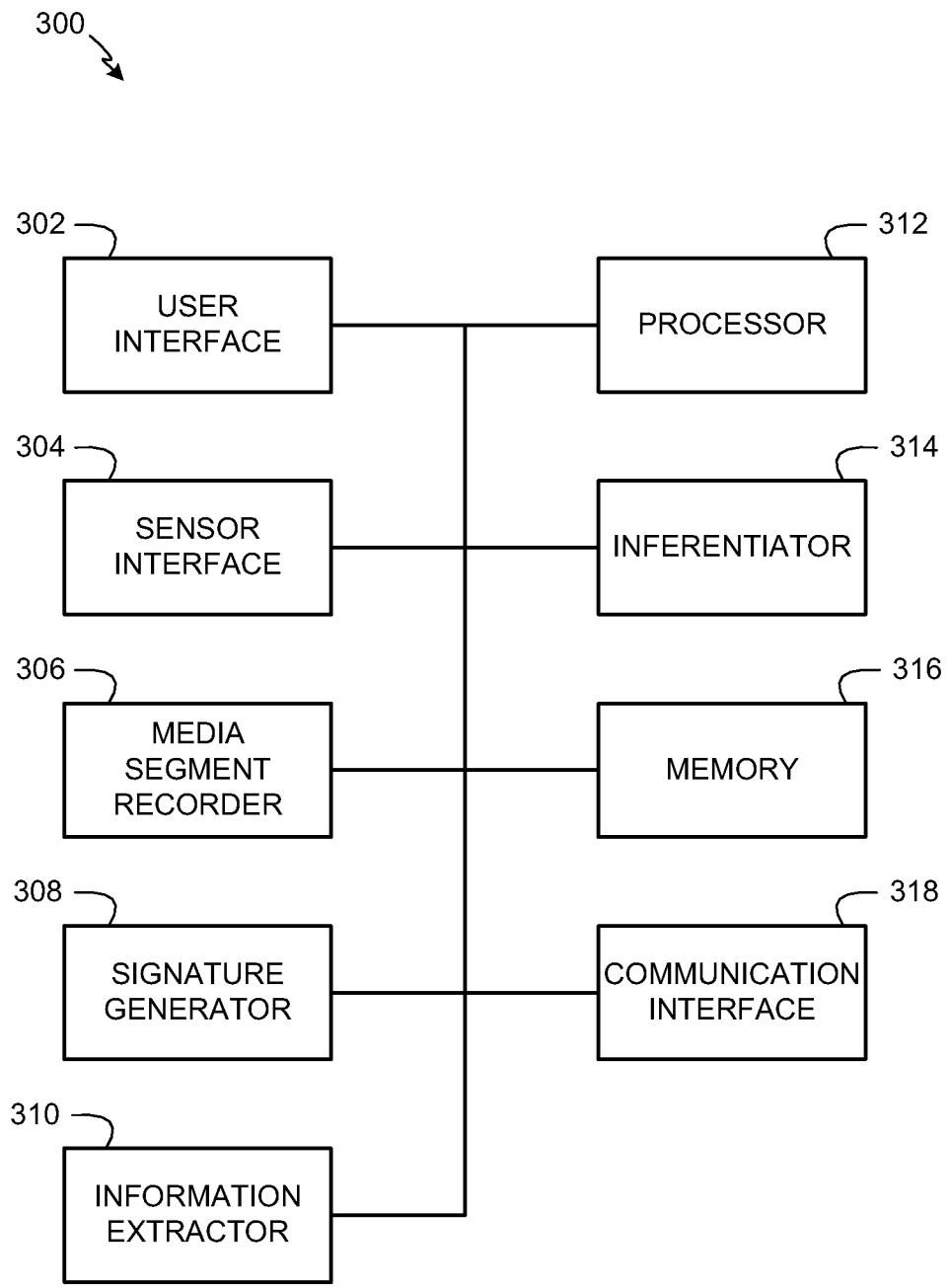
FIG. 3 illustrates an example apparatus that may be used to initiate sharing and/or recording of media content from a user device of FIGS. 1 and 2 in accordance with example methods disclosed herein.

FIG. 3 illustrates an example apparatus 300 that may be used to initiate sharing and/or recording of media content (e.g., the media content 106) in accordance with example methods disclosed herein. In illustrated examples disclosed herein, the apparatus 300 may be used to implement the user device 102 and/or the media access application program 234 executed by the user device 102. In the illustrated example of FIG. 3, the example apparatus 300 includes an example user interface 302, an example sensor interface 304, an example media segment recorder 306, an example signature generator 308, an example information extractor 310, an example processor 312, an example inferentiator 314, an example memory 316, and an example communication interface 318. While an example manner of implementing the apparatus 300 has been illustrated in FIG. 3, one or more of the elements, processes and/or devices illustrated in FIG. 3 may be combined, divided, re-arranged, omitted, eliminated and/or implemented in any other way. Further, the user interface 302, the sensor interface 304, the media segment recorder 306, the signature generator 308, the information extractor 310, the processor 312, the inferentiator 314, the memory 316, and the communication interface 318 and/or, more generally, the example apparatus 300 of FIG. 3 may be implemented by hardware, software, firmware and/or any combination of hardware, software and/or firmware. Thus, for example, any of the user interface 302, the sensor interface 304, the media segment recorder 306, the signature generator 308, the information extractor 310, the processor 312, the inferentiator 314, the memory 316, and the communication interface 318 and/or, more generally, the example apparatus 300 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus or system claims are read to cover a purely software and/or firmware implementation, at least one of the user interface 302, the sensor interface 304, the media segment recorder 306, the signature generator 308, the information extractor 310, the processor 312, the inferentiator 314, the memory 316, and/or the communication interface 318 appearing in such claim is hereby expressly defined to include a computer readable medium such as a memory, DVD, CD, etc. storing the software and/or firmware. Further still, the example apparatus 300 of FIG. 3 may include one or more elements, processes and/or devices in addition to, or instead of, those illustrated in FIG. 3, and/or may include more than one of any or all of the illustrated elements, processes and devices.

The user interface 302 of the illustrated example is provided to display information via the user device 102 and to receive user input from the user 104 via the user device 102. The sensor interface 304 of the illustrated example receives audio, video, and/or image information captured by one or more attached sensors of ambient audio, video, and/or images detectable by the sensors when the user device 102 is in the vicinity of such ambient audio, video, and/or images. For example, when the user device 102 is in sufficient proximity to the media presentation device 108 (FIGS. 1 and 2), the sensor interface 304 may receive audio, video, and/or image capture information from one or more attached sensors based on the detected media content 106 presented by the media presentation device 108. In the illustrated example, the sensor interface 304 communicates with one or both of a microphone or an imaging sensor (e.g., a camera sensor).

The media segment recorder 306 of the illustrated example is provided to record segments of media content obtained via the sensor interface 304. For example, when the sensor interface 304 receives captured information (e.g., audio and/or video segment samples and/or still image captures) from attached sensors, the sensor interface 304 sends the captured information to the media segment recorder 306. In turn, the media segment recorder 306 stores the captured information in a memory 316 for subsequent use in recognizing the detected media content (e.g., the media content 106 of FIGS. 1 and 2).

The signature generator 308 of the illustrated example is provided to generate audio, video, and/or still image signatures based on media segments recorded and stored by the media segment recorder 306. In this manner, the generated signatures can be used as media-representative information or media representations from which media content such as the media content 106 can be recognized.

The information extractor 310 of the illustrated example is provided to extract data and/or codes (e.g., audio codes, video codes, still image codes, watermarks, media metadata, etc.) from media segments recorded and stored by the media segment recorder 306. In this manner, the extracted codes can be used as media-representative information or media representations from which media content such as the media content 106 can be recognized.

In some examples, the apparatus 300 may be configured to dynamically determine when to use the signature generator 308 to generate signatures, when to use the information extractor 310 to extract information or codes from detected media content, and/or when not to use either of the signature generator 308 or the information extractor 310 and to instead store one or more media sample segments recorded by the media segment recorder 306 as media-representative information. For example, in instances in which the information extractor 310 analyzes media segments recorded by the media segment recorder 306 and determines that no embedded information or codes are located therein, the apparatus 300 may determine to use the signature generator 308 to generate signatures of the captured media segments not having embedded information. For instances in which the apparatus 300 is configured to not use the signature generator 308 or the information extractor 310, the apparatus 300 stores one or more audio sample segments captured by the media segment recorder 306 in the memory 316 to use a media-representative information. Although the example apparatus 300 is shown as including both the signature generator 308 and the information extractor 310, in other examples, the apparatus 300 may be provided with only the signature generator 308 to always generate signatures of detected media content or only the information extractor 310 to extract embedded information or codes when available in detected media content or neither of the signature generator 308 or the information extractor 310, in which case the apparatus 300 stores audio sample segments for use as media-representative information.

The processor 312 of the illustrated example is provided to manage the overall operations of the example apparatus 300 and/or the user device 102. For example, the processor 312 may facilitate or manage exchange of information within the apparatus 300 and/or between the apparatus 300 and external entities such as the media access service entity 122 of FIGS. 1 and 2. In some examples, the processor 312 determines when to use the signature generator 308 and when to use the information extractor 310 based on whether embedded information is located in media segments recorded by the media segment recorder 306 as discussed above.

The inferentiator 314 of the illustrated example is provided to determine when the user 104 may be interested in particular detected media content. For example, as discussed above in connection with FIG. 2, the user 104 may set the media access application program 234 to automatically periodically and/or aperiodically monitor ambient audio, video, and/or still images for media content that may be of interest to the user 104. Under such type of operation, when the apparatus 300 obtains media content identification information for media segments from the media access service entity 122, the inferentiator 314 determines whether the user 104 may be interested in the detected media content. In the illustrated example, the inferentiator 314 makes such determinations based on user-provided media preferences provided by the user 104 to the media access application program 234 during a configuration phase.

The memory 316 of the illustrated example is provided to store media segments recorded by the media segment recorder 306 and media-representation information or media representations in the form of signatures generated by the signature generator 308 and/or in the form of embedded information or codes extracted by the information extractor 310.

The communication interface 318 of the illustrated example is provided to enable communications between the user device 102 and the Internet 124 and the media access service entity 122. In this manner, the user device 102 can send queries to the media access service entity 122 via the Internet 124 requesting to share and/or record media content and/or requesting to receive media identification information (e.g., song title, television program title, television program episode number, newscast program name, movie title, etc.) and/or media metadata (e.g., genre, artist name, movie type, television program type, song decade, etc.) of detected media content. In addition, the user device 102 receives communications from the media access service entity 122 via the communication interface 318.

Figure 4A:
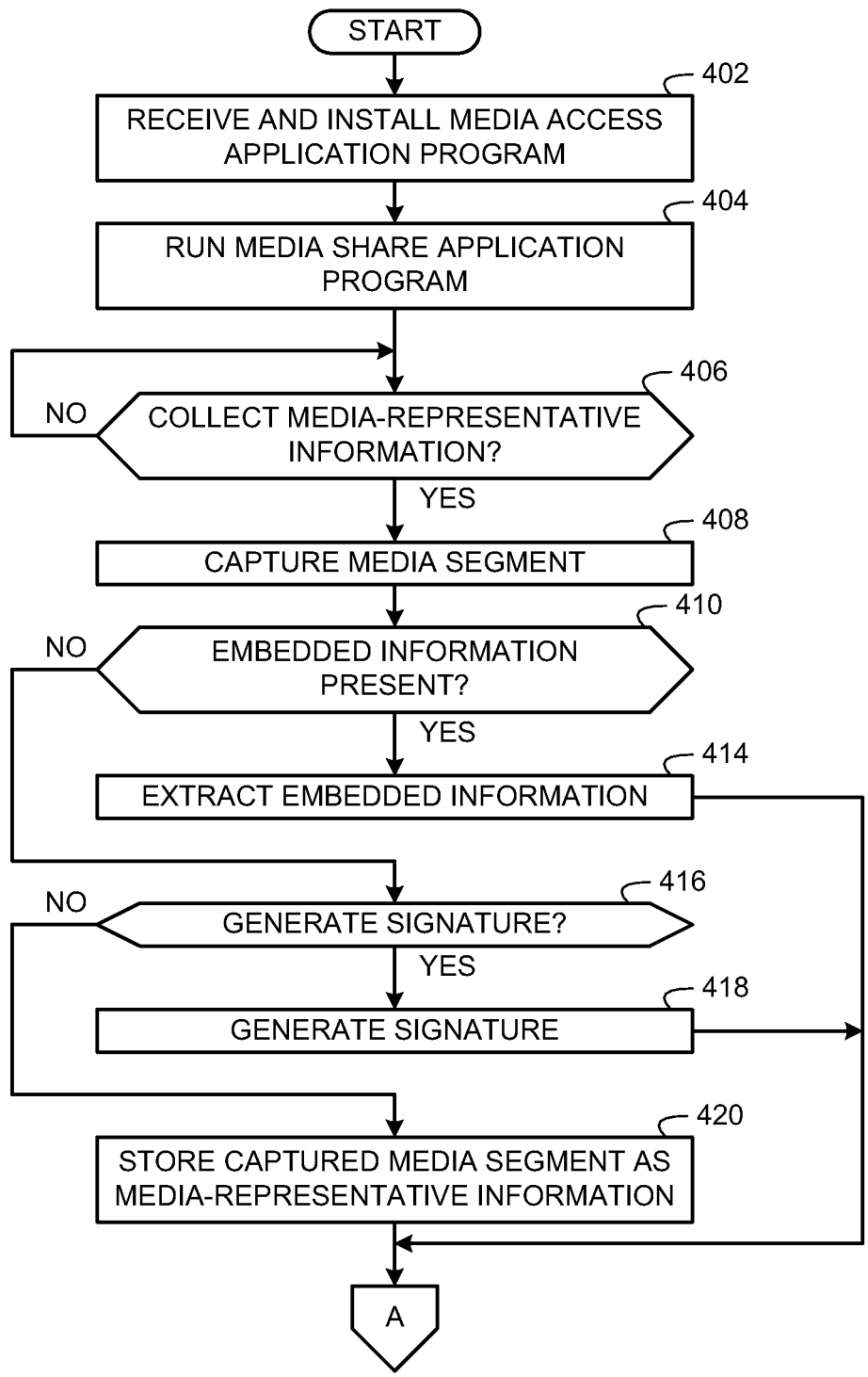
FIGS. 4A and 4B are a flow diagram representative of example machine readable instructions that may be executed at the user device of FIGS. 1 and 2 to initiate sharing and/or recording of media content.
Figure 4B:
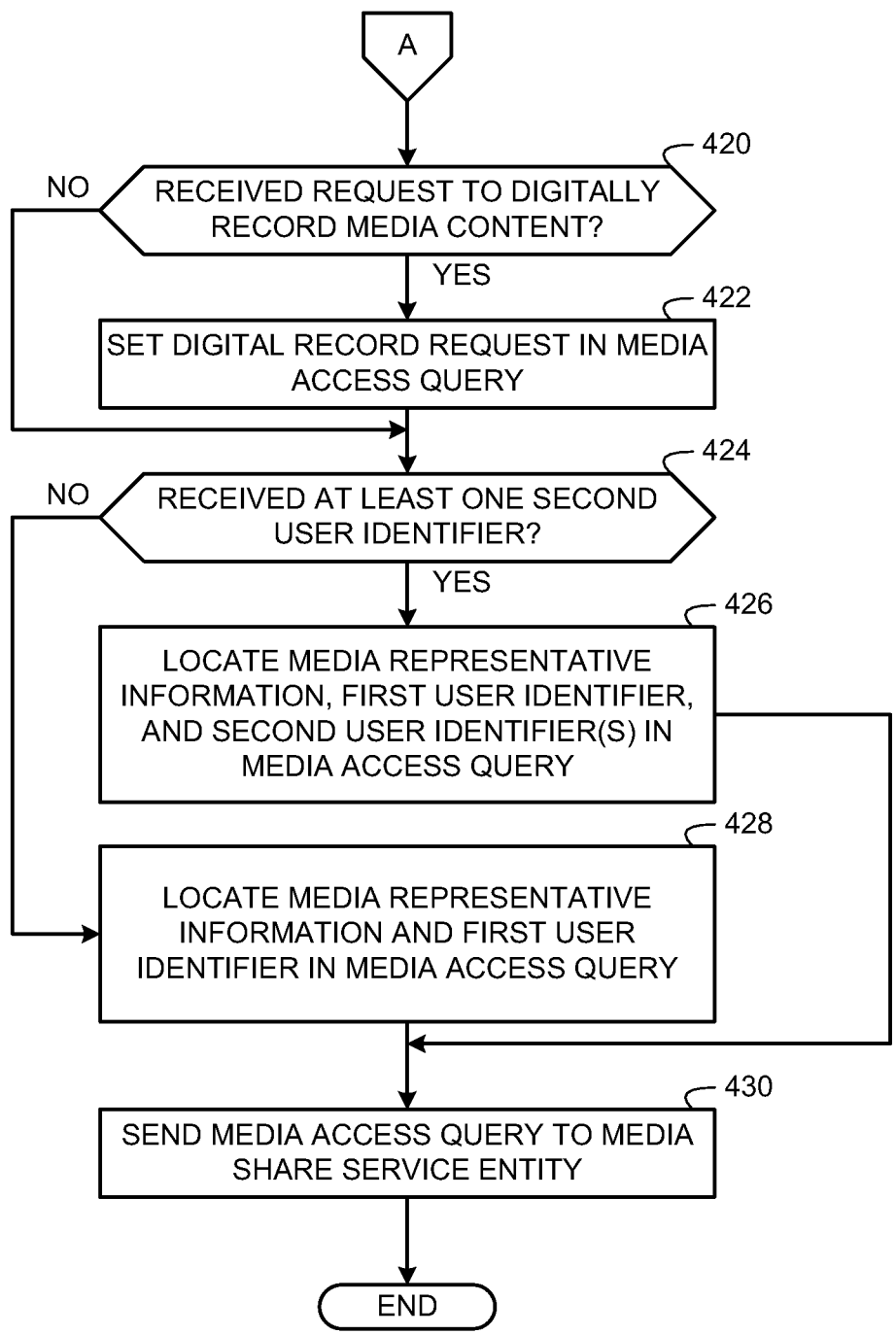
Figure 5A:
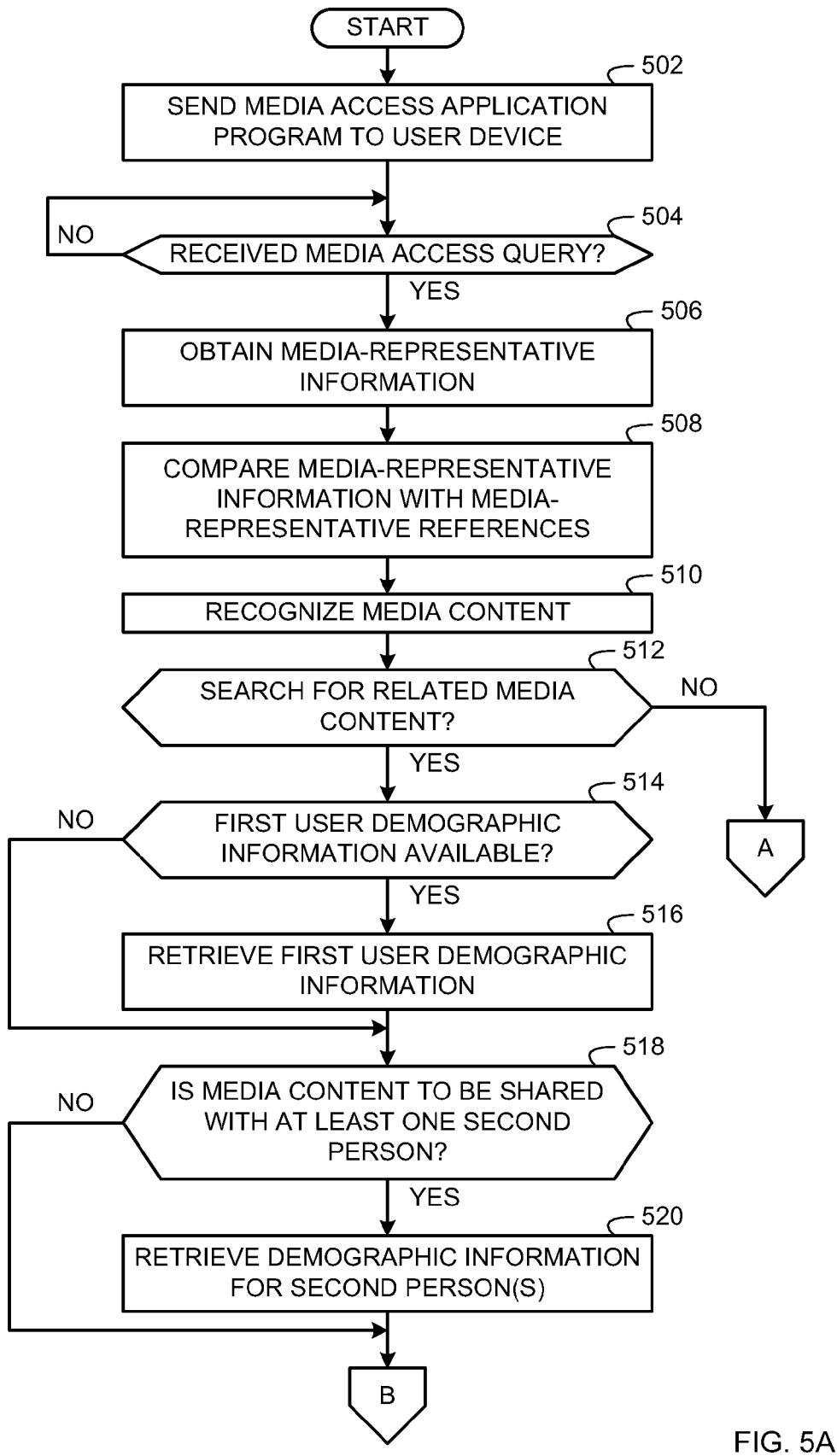
FIGS. 5A and 5B are a flow diagram representative of example machine readable instructions that may be executed at the example media access service entity of FIGS. 1 and 2 to share and/or record media content.
Figure 5B:
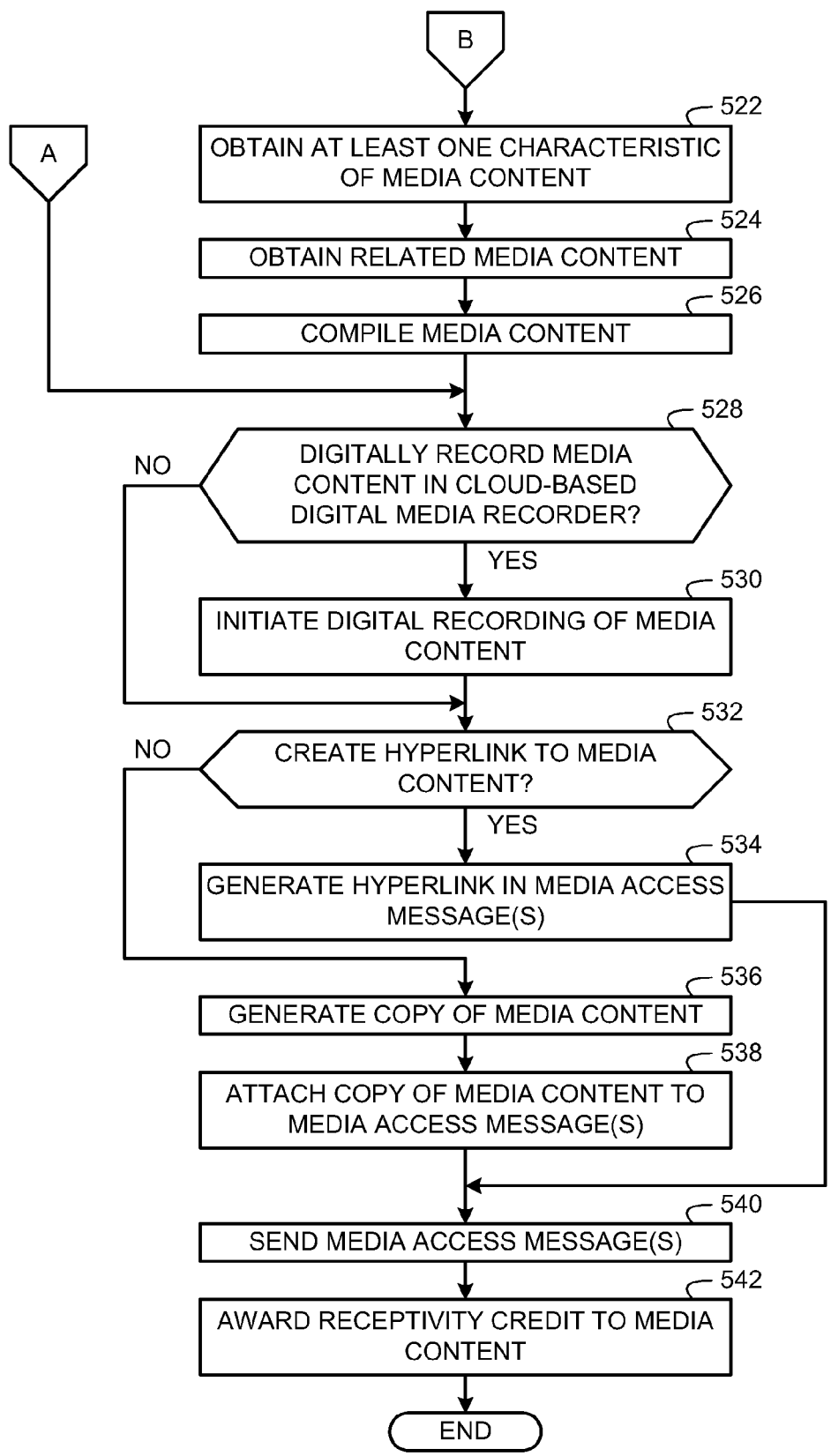

FIGS. 4A and 4B are a flow diagram representative of example machine readable instructions (e.g., the media access application program 234 of FIG. 2) that may be executed by the user device 102 of FIGS. 1 and 2 to initiate sharing and/or recording of media content. FIGS. 5A and 5B are a flow diagram representative of example machine readable instructions that may be executed at the example media access service entity 122 of FIGS. 1 and 2 to share and/or record media content. The example processes of FIGS. 4A, 4B, 5A, and 5B may be implemented using machine readable instructions that, when executed, cause a device (e.g., a programmable controller, processor (e.g., the processor 312 of FIG. 3 and/or the processor 612 of FIG. 6), or other programmable machine or integrated circuit) to perform the operations shown in FIGS. 4A, 4B, 5A, and 5B. For instance, the example processes of FIGS. 4A, 4B, 5A, and 5B may be performed using a processor, a controller, and/or any other suitable processing device. For example, the example processes of FIGS. 4A, 4B, 5A, and 5B may be implemented using coded instructions stored on a tangible machine readable medium such as a flash memory, a read-only memory (ROM), and/or a random-access memory (RAM).

As used herein, the term tangible computer readable medium is expressly defined to include any type of computer readable storage and to exclude propagating signals. Additionally or alternatively, the example processes of FIGS. 4A, 4B, 5A, and 5B may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, the example processes of FIGS. 4A, 4B, 5A, and 5B may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, the example processes of FIGS. 4A, 4B, 5A, and 5B may be implemented as any combination(s) of any of the foregoing techniques, for example, any combination of firmware, software, discrete logic and/or hardware.

Although the example processes of FIGS. 4A, 4B, 5A, and 5B are described with reference to the flow diagrams of FIGS. 4A, 4B, 5A, and 5B, other methods of implementing the processes of FIGS. 4A, 4B, 5A, and 5B may be employed. For example, the order of execution of the blocks may be changed, and/or some of the blocks described may be changed, eliminated, sub-divided, or combined. Additionally, one or both of the example processes of FIGS. 4A, 4B, 5A, and 5B may be performed sequentially and/or in parallel by, for example, separate processing threads, processors, devices, discrete logic, circuits, etc.

Turning to FIGS. 4A and 4B in detail, initially the user device 102 receives and installs the media access application program 234 (block 402) (FIG. 4A) from the application program distribution interface 232 (FIG. 2) of the media access service entity 122 or via another service (e.g., the ITunes® application). The user device 102 then executes or runs the media access application program 234 (block 404), and the processor 312 (FIG. 3) determines whether the user device 102 should start a media-representative information collection process (block 406). For example, the user 104 may provide user input via the user interface 302 (FIG. 3) specifying to share and/or record media content (e.g., the media content 106) that the user 104 is exposed to and interested in. Alternatively, the user device 102 operates in an automatic mode in which the sensor interface 304 periodically or aperiodically captures audio, video, and/or image samples of ambient audio, video, and/or images in the surrounding area of the user device 102 and the inferentiator 314 (FIG. 3) determines whether the user 104 may be interested in the detected media content based on user-provided media preference information. If the user device 102 should not yet start a media-representative information collection process, control remains at block 406 until the media-representative information collection process is to begin or until the example process of FIGS. 4A and 4B ends.

If the user device 102 is to start a media-representative information collection process (block 406), the media segment recorder 306 (FIG. 3) captures a media segment (block 408) based on capture information received from the sensor interface 304. The information extractor 310 determines whether embedded information (e.g., codes, metadata, watermarks, etc.) are present in the captured media segment (block 410). If embedded information is present, the information extractor 310 extracts the embedded information from the captured media segment (block 412) and stores the same in the memory 316 to use as media-representative information.

If embedded information is not present (block 410), the signature generator 308 determines whether it should generate a signature (block 416). For example, the user device 102 may be configured to generate signatures when embedded information is not present in captured media segments. Alternatively, the user device 102 may be configured to not generate signatures or extract media information from media segments but to use the one or more media samples captured by the media segment recorder 306 as media-representative information. If the signature generator 308 determines that it should generate a signature, the signature generator 308 generates the signature (block 416) and stores the same in the memory 316 to use as media-representative information. If the signature generator 308 determines that it should not generate signatures (block 414), the media segment recorder 306 stores one or more media samples of the captured media segment in the memory 316 to use as media-representative information (block 418).

The user interface 302 determines whether it has received a request (e.g., from the user 104 of FIGS. 1 and 2) to digitally record detected media content (block 420) (FIG. 4B). For example, the user 104 may provide user input to the user device 102 indicating that the user 104 is interested in recording and/or sharing the media content 106 of FIGS. 1 and 2 when the user 104 hears or sees the media content 106 when it is presented by the media presentation device 108. Alternatively, the user device 102 may display a listing of media content that it has recently detected and ask the user 104 whether any of the detected media content should be recorded and/or shared.

If the user interface 302 determines that the detected media content 106 should be recorded (block 420), the processor 312 sets a digital record request in a media access query (block 422). After setting the digital record request or if the user interface 302 determines at block 420 that it should not record the media content, the user interface 302 determines whether it has received at least one second user identifier indicative of one or more second persons with which to selectively share the detected media content 106 (block 424). If the user interface 302 has received one or more second user identifiers (block 424) of second person(s) with which to selectively share the media content 106, the processor 312 locates the media-representative information, the first user identifier of the user 104, and the one or more second user identifier(s) in the media access query (block 426) and control advances to block 430. If the user interface 302 determines at block 424 that it will not and has not received one or more second user identifiers (e.g., the user 104 intends to only record and not share the media content 106), the processor 312 locates the media representative information and first user identifier of the user 104 in the media access query (block 428). The communication interface 318 sends the media access query to the media access service entity 122 (block 430). The example process of FIGS. 4A and 4B then ends.

Turning now to the process of FIGS. 5A and 5B, initially, the application program distribution interface 232 (FIG. 2) sends the media access application program 234 (FIG. 2) to the user device 102 (FIGS. 1 and 2) (block 502) (FIG. 5A). The query interface 220 (FIG. 2) determines whether it has received a media access query (block 504) from, for example, the user device 102. If the query interface 220 has not received a media access query, control remains at block 504 until a media access query is received or until the example process of FIGS. 5A and 5B is ended.

If the query interface 220 determines at block 504 that it has received a media access query, the query interface 220 obtains media-representative information (e.g., a signature, a code, metadata, a media sample segment, etc.) from the media access query (block 506). The media content recognizer 218 (FIG. 2) compares the media-representative information with media-representative references from the media reference data source 210 (FIG. 2) (block 508) and recognizes the media content 106 (block 510) based on a matching one of the media-representative references.

The query interface 220 determines whether it should search for related or auxiliary media content (block 512) such as one or more advertisements and/or one or more other relevant media content (e.g., song(s) or song clip(s), television program episode(s) or clip(s), movie(s) or clip(s), etc.). If the query interface 220 determines that it should not search for related or auxiliary media content, control advances to block 528 of FIG. 5B.

If the query interface 220 determines at block 512 that it should search for related or auxiliary media content, the query interface 220 determines whether first user demographic information for the first user 104 is available (block 514). For example, the query interface 220 may query the demographics data store 134 (FIG. 1) for demographic information of the user 104 based on a user identifier of the user 104 and/or a geographic area from which the user device 102 sent the media access query. If the demographics data store 134 has demographic information for the user 104, the query interface 220 retrieves the first user demographic information (block 516).

After retrieving the demographic information for the user 104 (block 516) or if the query interface 220 determines at block 514 that the first user demographic information is not available for the user 104, the query interface 220 determines whether media content is to be shared with at least one second person (block 518) by, for example, analyzing the received media access query for the presence of one or more second user identifiers indicative of one or more second persons. If the query interface 220 determines that the media content is to be shared with one or more second persons, the query interface 220 retrieves demographic information for the second person(s), if available from the demographics data store 134 (block 520). After retrieving the demographic information for the second person(s) (block 520) or if the query interface 220 determines at block 518 that the media content is not to be shared with one or more second persons, control advances to block 522 of FIG. 5B.

The query interface 220 obtains at least one characteristic of the recognized media content 106 (block 522) (FIG. 5B). For example, after the media content recognizer 218 recognizes the media content 106, the query interface 220 can query the recorded media and license data store 128 (FIGS. 1 and 2) for information (e.g., metadata) indicative of one or more characteristics of the recognized media content 106. The query interface 524 then obtains related or auxiliary media content (block 524). For example, the query interface 524 may search the recorded media and license data store 128 for relevant media content and/or the query interface 220 may work with the advertisement interface 224 and/or the advertiser interface 226 of FIG. 2 to obtain one or more relevant advertisements based on one or more of the first user demographic information of the user 104, the second person(s) demographic information, and/or the characteristic(s) of the media content 106. The media access provider 222 (FIG. 2) generates a media compilation including copies of the media content 106 and one or more related or auxiliary media content (block 526). In some examples, the media access provider 222 may generate a different media compilation for each of the user 104 and the one or more second person(s). In such examples, all of the media compilations include a copy of the media content 106, but each media compilation includes a copy of a different auxiliary media content that is uniquely selected for the respective recipient (e.g., the user 104 or the second person(s)) based on the recipient's demographic information.

After generating the media compilation at block 526 or if the query interface 220 determines at block 512 (FIG. 5A) that it should not search for related or auxiliary media content, the query interface 220 determines whether it should initiate a digital recording of the media content 106 at the cloud-based DVR 114 (FIG. 1) (block 528). For example, the query interface 220 may analyze the received media access query for an indication to record the media content 106. If the query interface 220 determines that it should initiate a digital recording of the media content 106, the query interface 220 initiates a digital recording of the media content 106 (block 530) by, for example, sending a digital recording request to the cloud-based DVR 114 to store a copy of the media content 106 or the media compilation generated at block 526. In some examples, the cloud-based DVR 114 uses a digital rights management process to determine how to store a copy of the media content 106 in a manner consistent with media licensing rights of the media content 106.

After initiating the digital recording at block 530 or if the query interface 220 determines at block 528 that it should not initiate a digital recording, the media access provider 222 determines whether it should create a hyperlink to the media content 106 or the media compilation generated at block 526 (block 532). For example, creating a hyperlink may be dictated by user preference or by media distribution licensing rights available to the media access service entity 122. If a user preference indicates that hyperlinks are preferred and/or if license rights require hyperlinks to provide access to the media content 106, the media access provider 222 generates a hyperlink to the media content 106 or the media compilation generated at block 526 and locates the hyperlink in one or more media access message(s) to be sent to the user 104 and/or one or more second person(s) selectively specified by the user 104 (block 534).

If the media access provider 222 determines at block 532 that it should not create a hyperlink to the media content 106 or the media compilation generated at block 526, the media access provider 222 generates a copy of the media content 106 or the media compilation generated at block 526 (block 536) and attaches the copy to the one or more media access message(s) to be sent to the user 104 and/or one or more second person(s) selectively specified by the user 104 (block 538).

After locating the hyperlink in the media access message(s) at block 534 or after attaching a copy of the media content 106 or the media compilation generated at block 526 to the media access message(s), the media access provider 222 sends the messages to one or more of the user email accounts 110*a-b* and/or to one or more of the user web pages 112*a-b* for posting thereon (block 540). In addition, the media creditor 228 stores an audience-interest credit or receptivity credit in the receptivity measures data store 230 as awarded to the media content 106 and/or a corresponding network station (e.g., the media content provider 118 of FIG. 1) identified by the station detector 214 as being the provider of the media content 106 (block 542). The example process of FIGS. 5A and 5B then ends.

Figure 6:
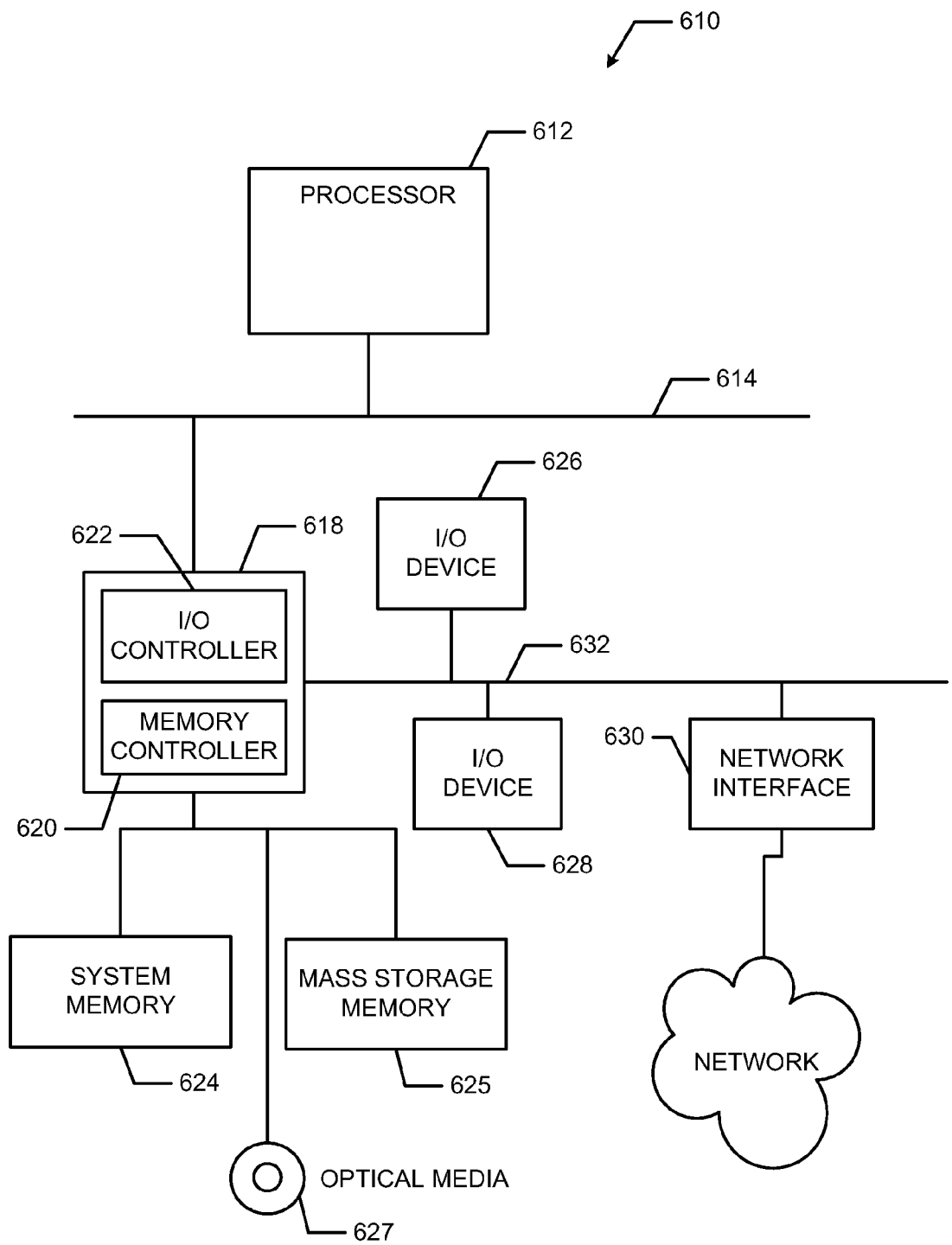
FIG. 6 is an example processor system that may be used to execute the example instructions of FIGS. 4A and 4B to implement the example apparatus of FIG. 3 and/or to execute the example instructions of FIGS. 5A and 5B to implement systems and/or apparatus of the example media access service entity of FIGS. 1 and/or 2.

FIG. 6 is an example processor system that can be used to execute the example instructions of FIGS. 4A and 4B to implement the example apparatus 300 of FIG. 3 and/or to execute the example instructions of FIGS. 5A and 5B to implement systems and/or apparatus of the example media access service entity 122 of FIGS. 1 and 2. As shown in FIG. 6, the processor system 610 includes a processor 612 that is coupled to an interconnection bus 614. The processor 612 may be any suitable processor, processing unit, or microprocessor. Although not shown in FIG. 6, the system 610 may be a multi-processor system and, thus, may include one or more additional processors that are identical or similar to the processor 612 and that are communicatively coupled to the interconnection bus 614.

The processor 612 of FIG. 6 is coupled to a chipset 618, which includes a memory controller 620 and an input/output (I/O) controller 622. A chipset provides I/O and memory management functions as well as a plurality of general purpose and/or special purpose registers, timers, etc. that are accessible or used by one or more processors coupled to the chipset 618. The memory controller 620 performs functions that enable the processor 612 (or processors if there are multiple processors) to access a system memory 624, a mass storage memory 625, and/or an optical media 627.

In general, the system memory 624 may include any desired type of volatile and/or non-volatile memory such as, for example, static random access memory (SRAM), dynamic random access memory (DRAM), flash memory, read-only memory (ROM), etc. The mass storage memory 625 may include any desired type of mass storage device including hard disk drives, optical drives, tape storage devices, etc. The optical media 627 may include any desired type of optical media such as a digital versatile disc (DVD), a compact disc (CD), or a blu-ray optical disc.

The I/O controller 622 performs functions that enable the processor 612 to communicate with peripheral input/output (I/O) devices 626 and 628 and a network interface 630 via an I/O bus 632. The I/O devices 626 and 628 may be any desired type of I/O device such as, for example, a keyboard, a video display or monitor, a mouse, etc. The network interface 630 may be, for example, an Ethernet device, an asynchronous transfer mode (ATM) device, an 802.11 device, a digital subscriber line (DSL) modem, a cable modem, a cellular modem, etc. that enables the processor system 610 to communicate with another processor system.

While the memory controller 620 and the I/O controller 622 are depicted in FIG. 6 as separate functional blocks within the chipset 618, the functions performed by these blocks may be integrated within a single semiconductor circuit or may be implemented using two or more separate integrated circuits.

Although the above discloses example methods, apparatus, systems, and articles of manufacture include, among other components, firmware and/or software executed on hardware, it should be noted that such methods, apparatus, systems, and articles of manufacture are merely illustrative and should not be considered as limiting. For example, it is contemplated that any or all of these hardware, firmware, and/or software components could be embodied exclusively in hardware, exclusively in firmware, exclusively in software, or in any combination of hardware, firmware, and/or software. Accordingly, while the above describes example methods, apparatus, systems, and articles of manufacture, the examples provided are not the only ways to implement such methods, apparatus, systems, and articles of manufacture. Therefore, although certain example methods, apparatus, systems, and articles of manufacture have been described herein, the scope of coverage of this patent is not limited thereto. On the contrary, this patent covers all methods, apparatus and articles of manufacture fairly falling within the scope of the claims of this patent.

What it claimed is:

1. A method to share media, comprising:
   receiving from a mobile device:
      a representation of media content being presented by a media presentation device separate from the mobile device and captured by the mobile device via a sensor, and
      a first user identifier of a first user of the mobile device and a second user identifier of a second user different from the first user;
   based on the second user identifier, selectively providing the second user with access to the media content identified based on the representation of the media content; and
   when the access to the media content is provided to the second user, crediting the media content with audience-interest credit based on the first user identifier.

2. A method as defined in claim 1, further comprising identifying additional content relevant to at least one of the first user or the second user based on at least one of a characteristic of the media content, an identity of the media content, or demographic information of the first user or the second user.

3. A method as defined in claim 1, further comprising sending a hyperlink to the first user based on the first user identifier, the hyperlink corresponding to an Internet location that provides access to the media content.

4. A method as defined in claim 1, wherein the representation of the media content is at least one of a signature generated based on the media content or a code from the media content.

5. A method as defined in claim 1, wherein the first and second user identifiers are email addresses.

6. A method as defined in claim 1, wherein the media content comprises at least one of a television program, a movie, a newscast, radio content, a song, an image, or an advertisement.

7. A method as defined in claim 1, wherein selectively providing the second user with access to the media content comprises providing the second user with a copy of the media content or a hyperlink to access the media content via the Internet.

8. A method as defined in claim 1, further comprising:
   receiving a request from the mobile device to store the media content; and
   initiating storing of at least one of a copy of a television program episode advertised in the media content, a copy of a movie advertised in the media content, or a copy of a song advertised in the media content, the storing occurring at a cloud-based digital video recorder location accessible by the first user.

9. A method as defined in claim 1, wherein crediting the media content with audience-interest credit comprises crediting at least one of the media content, a television program episode advertised in the media content, a movie advertised in the media content, or a song advertised in the media content based on the representation of the media content from the mobile device.

10. A method as defined in claim 1, wherein the media content is provided to the second user after determining that the media content is associated with license information that allows the media content to be shared.

11. A method as defined in claim 1, wherein the second identifier is selected by the first user.

12. A method as defined in claim 1, wherein selectively providing the second user with access to the media content comprises selecting at least one of sending a copy of the media content to an email address associated with the second user, sending a hyperlink corresponding to an Internet location that provides access to the media content to the email address associated with the second user, or posting the hyperlink corresponding to an Internet location that provides access to the media content to a webpage associated with the second user.

13. A tangible computer readable storage medium comprising instructions that, when executed, cause a machine to at least:
- access a representation of media content being presented by a media presentation device separate from a mobile device and captured by a sensor of the mobile device, and
- access a first user identifier of a first user of the mobile device and a second user identifier of a second user different from the first user;
- send a hyperlink to the first user based on the first user identifier, the hyperlink corresponding to an Internet location that provides access to the media content identified based on the representation of the media content; and
- selectively provide the second user with access to the media content based on the second user identifier; and
- when the access to the media content is provided to the second user, credit the media content with audience-interest credit based on the first user identifier.

14. A computer readable medium as defined in claim 13 further comprising instructions that, when executed, cause the machine to identify additional media content relevant to at least one of the first user or the second user based on at least one of demographic information of the first user or the second user, an identity of the media content, or a characteristic of the media content.

15. A computer readable medium as defined in claim 14, wherein the additional media content is an advertisement.

16. A computer readable medium as defined in claim 13, wherein the representation of the media content is at least one of a signature generated based on the media content or a code extracted from the media content.

17. A computer readable medium as defined in claim 13, wherein the media content comprises at least one of a television program, a movie, a newscast, radio content, a song, an image, or an advertisement.

18. A computer readable medium as defined in claim 13 further comprising instructions that, when executed, cause the machine to:
- receive a request from the mobile device to store the media content; and
- initiate storing of at least one of a copy of a television program episode advertised in the media content, a copy of a movie advertised in the media content, or a copy of a song advertised in the media content, the storing occurring at a cloud-based digital video recorder location accessible by the first user.

19. A computer readable medium as defined in claim 18 wherein crediting the media content with audience-interest credit comprises crediting to at least one of the television program episode, the movie, or the song based on the initiating of the storing.

* * * * *